United States Patent
McKean et al.

(10) Patent No.: US 9,916,241 B2
(45) Date of Patent: Mar. 13, 2018

(54) STORAGE CONTROLLER CACHING USING SYMMETRIC STORAGE CLASS MEMORY DEVICES

(71) Applicant: NetApp, Inc., Sunnyvale, CA (US)

(72) Inventors: Brian McKean, Boulder, CO (US); Gregory Friebus, Wichita, KS (US); Sandeep Kumar R. Ummadi, Boulder, CO (US); Pradeep Ganesan, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 108 days.

(21) Appl. No.: 14/826,870

(22) Filed: Aug. 14, 2015

(65) Prior Publication Data

US 2017/0046259 A1 Feb. 16, 2017

(51) Int. Cl.
*G06F 12/00* (2006.01)
*G06F 12/0804* (2016.01)
*G06F 12/02* (2006.01)

(52) U.S. Cl.
CPC ...... *G06F 12/0804* (2013.01); *G06F 12/0238* (2013.01); *G06F 12/0246* (2013.01); *G06F 2212/1021* (2013.01); *G06F 2212/283* (2013.01); *G06F 2212/312* (2013.01); *G06F 2212/608* (2013.01)

(58) Field of Classification Search
CPC ............. G06F 12/0804; G06F 12/0238; G06F 12/0246; G06F 2212/1021; G06F 2212/283; G06F 2212/312; G06F 2212/608
See application file for complete search history.

(56) References Cited

U.S. PATENT DOCUMENTS

| | | | | |
|---|---|---|---|---|
| 5,802,561 A | * | 9/1998 | Fava | G06F 11/2087 711/120 |
| 8,375,184 B2 | * | 2/2013 | Kumar | G06F 11/2089 711/114 |
| 8,443,134 B2 | * | 5/2013 | Flynn | G06F 9/52 711/103 |
| 2013/0254457 A1 | * | 9/2013 | Mukker | G06F 11/1441 711/103 |

* cited by examiner

Primary Examiner — Shawn X Gu
(74) Attorney, Agent, or Firm — Haynes and Boone, LLP

(57) ABSTRACT

Systems and techniques for performing a data transaction are disclosed that provide data redundancy using two or more cache devices. In some embodiments, a data transaction is received by a storage controller of a storage system from a host system. The storage controller caches data and/or metadata associated with the data transaction to at least two cache devices that are discrete from the storage controller. After caching, the storage controller provides a transaction completion response to the host system from which the transaction was received. In some examples, each of the at least two cache devices includes a storage class memory. In some examples, the storage controller caches metadata to the at least two cache devices and to a controller cache of the storage controller, while data is cached to the at least two cache devices without being cached in the controller cache.

20 Claims, 8 Drawing Sheets

STORAGE CONTROLLER CACHING USING SYMMETRIC STORAGE CLASS MEMORY DEVICES

TECHNICAL FIELD

The present description relates to data storage and retrieval and, more specifically, to techniques and systems for caching data by a storage controller to one or more storage class memory devices or other suitable non-volatile memory devices.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out a storage architecture to meet these expectations enables the next generation of applications, which is expected to bring even greater demand.

While improvements to both hardware and software have continued to provide data storage solutions that are not only faster but more reliable, device failures have not been completely eliminated. For example, even though storage controllers and storage devices have become more resilient and durable, they are not infallible. To guard against data loss, a storage system may maintain multiple copies of data stored on different discrete hardware devices. Should a device fail, the data can be recovered from one of the remaining copies. However, redundancy comes at a price. Not only do redundant copies necessitate additional storage space, they may also increase the burden on data-handling elements and on communication pathways there between. Furthermore, creating and maintaining additional copies may also increase the amount of time needed to complete a data transaction, and while some inefficiencies may be remedied by additional hardware, it may not be possible to reduce all impacts by merely adding hardware.

Therefore, in order to provide optimal data storage performance, a need exists for systems and techniques for managing redundant data that make efficient use of available hardware. In particular, systems and methods that maintaining data integrity with reduced data transaction latency without costly hardware upgrades would provide a valuable improvement over conventional storage systems. Thus, while existing storage systems have been generally adequate, the techniques described herein provide improved performance and efficiency.

BRIEF DESCRIPTION OF THE DRAWINGS

The present disclosure is best understood from the following detailed description when read with the accompanying figures.

DETAILED DESCRIPTION

Figure 1:
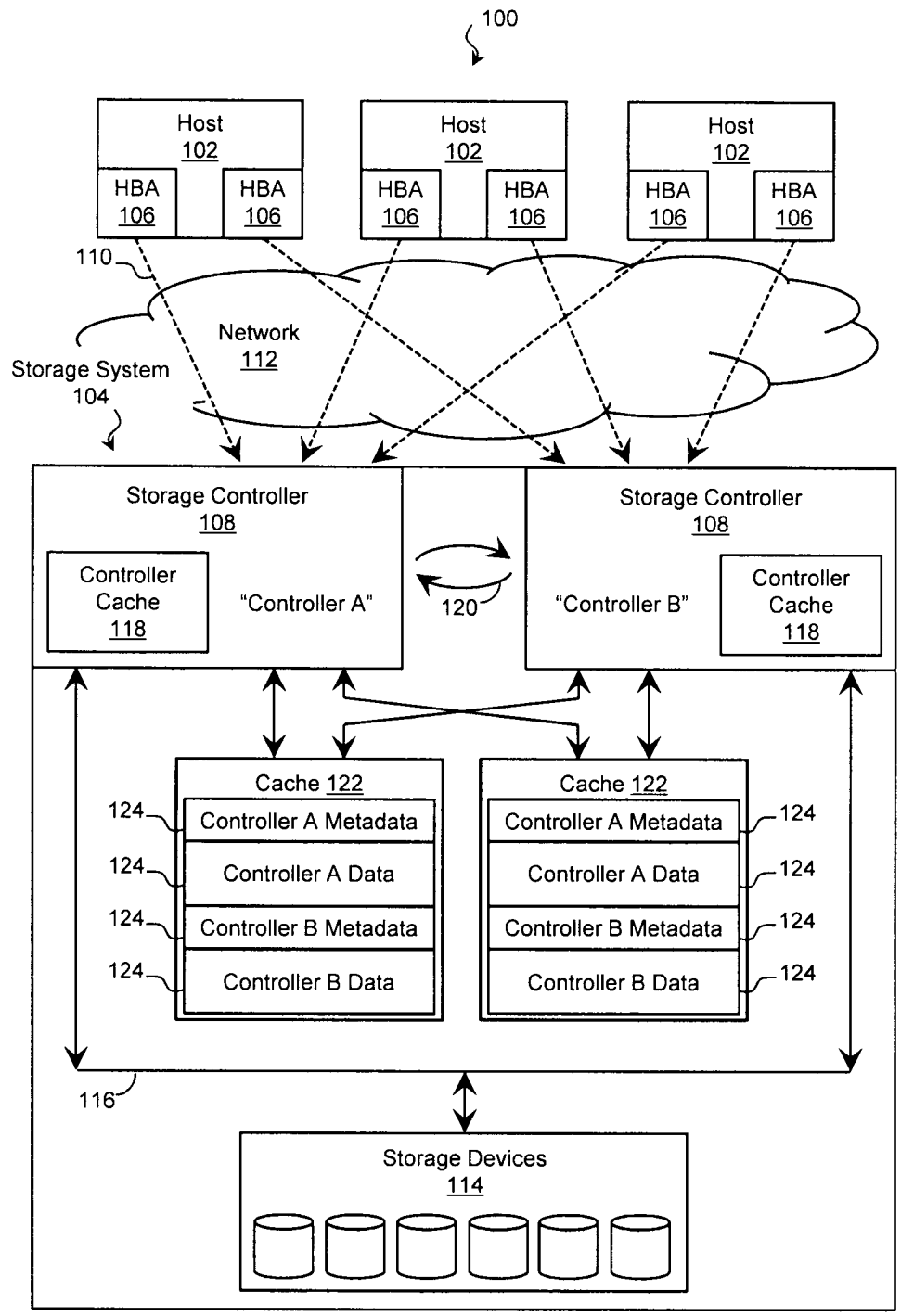
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for utilizing high-speed persistent storage such as Storage Class Memories (SCMs) to maintain two or more symmetric data caches for data redundancy to thereby improve transaction latency and data integrity. Although the scope of embodiments is not limited to any particular use case, in one example, a storage controller of a storage system receives a data transaction from a host system. The storage controller caches data and/or metadata associated with the data transaction in two or more SCMs (or other non-volatile storage media). The SCMs may be used as an alternative to mirroring the data in a controller cache of another storage controller.

The above aspects may provide multiple advantages. For example, SCM devices (and other non-volatile memories) are often much less expensive per byte and have larger capacities than a controller cache. This allows more data to be cached and more transactions to be serviced from the caches. In some examples, because the SCMs are discrete and separate from the storage controllers, a controller failure will not impact the SCMs. The SCMs can therefore maintain the data until the failed controller can be replaced. In some examples, the SCMs allow a controller to be swapped without rebuilding the controller's cache. Furthermore, in some examples, eliminating cache mirroring between controllers frees processing resources on the controllers that can be focused on performing their own transactions. Similarly, when storage controllers are no longer tasked with mirroring transactions, the exchange of data over an inter-controller bus may be dramatically reduced and cache space in the controller that would conventionally be set aside for mirroring is freed.

While writing to the SCMs, the storage controller may also store the data and/or metadata to its own controller cache. Maintaining both data and metadata in the controller cache allows the storage controller to provide another redundant copy, while maintaining only metadata allows a greater percentage of the address space to be cached in the controller. To further optimize the controller cache, in some examples, the controller cache records only a mapping that correlates SCM addresses to addresses in the storage devices. All other metadata is stored in the SCMs only.

In some examples, by storing data on the SCMs, a storage system with a single storage controller can still provide redundancy because multiple copies are stored on the SCMs. This provides a budget-friendly alternative to a multi-controller system because storage controllers are often more expensive than SCMs. In these aspects and others, the systems and techniques herein provide a substantial and practical improvement to conventional storage systems and conventional data transaction caching techniques. It is understood that these features and advantages are shared among the various examples herein and that no one feature or advantage is required for any particular embodiment.

FIG. 1 is a schematic diagram of an exemplary storage architecture 100 according to aspects of the present disclosure. The storage architecture 100 includes a number of hosts 102 in communication with a number of storage systems 104. It is understood that for clarity and ease of explanation, only a single storage system 104 is illustrated, although any number of hosts 102 may be in communication with any number of storage systems 104. Furthermore, while the storage system 104 and each of the hosts 102 are referred to as singular entities, a storage system 104 or host 102 may include any number of computing devices and may range from a single computing system to a system cluster of any size. Accordingly, each host 102 and storage system 104 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the hosts 102, a host 102 includes any computing resource that is operable to exchange data with a storage system 104 by providing (initiating) data transactions to the storage system 104. In an exemplary embodiment, a host 102 includes a host bus adapter (HBA) 106 in communication with a storage controller 108 of the storage system 104. The HBA 106 provides an interface for communicating with the storage controller 108, and in that regard, may conform to any suitable hardware and/or software protocol. In various embodiments, the HBAs 106 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In the illustrated embodiment, each HBA 106 is connected to a single storage controller 108, although in other embodiments, an HBA 106 is coupled to more than one storage controller 108.

Communications paths between the HBAs 106 and the storage controllers 108 are referred to as links 110. A link 110 may take the form of a direct connection (e.g., a single wire or other point-to-point connection), a networked connection, or any combination thereof. Thus, in some embodiments, one or more links 110 traverse a network 112, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, a host 102 has multiple links 110 with a single storage controller 108 for redundancy. The multiple links 110 may be provided by a single HBA 106 or multiple HBAs 106. In some embodiments, multiple links 110 operate in parallel to increase bandwidth.

To interact with (e.g., read, write, modify, etc.) remote data, a host 102 sends one or more data transactions to the respective storage system 104 via a link 110. Data transactions are requests to read, write, or otherwise access data stored within a data storage device such as the storage system 104, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Turning now to the storage system 104, the exemplary storage system 104 contains any number of storage devices 114 and responds to hosts' data transactions so that the storage devices 114 appear to be directly connected (local) to the hosts 102. The storage system 104 may group the storage devices 114 for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 102. In this way, the storage system 104 represents the group of devices as a single device, often referred to as a volume. Thus, a host 102 can access the volume without concern for how it is distributed among the underlying storage devices.

In various examples, the underlying storage devices 114 include hard disk drives (HDDs), solid state drives (SSDs), optical drives, and/or any other suitable volatile or non-volatile data storage medium. In some embodiments, the storage devices are arranged hierarchically and include a large pool of relatively slow storage devices and one or more caches (i.e., smaller memory pools typically utilizing faster storage media). Portions of the address space are mapped to the cache so that transactions directed to mapped addresses can be serviced using the cache. Accordingly, the larger and slower memory pool is accessed less frequently and in the background. In an embodiment, a storage device includes HDDs, while an associated cache includes NAND-based SSDs.

The storage system 104 also includes one or more storage controllers 108 in communication with the storage devices 114 and any respective caches. The storage controllers 108 exercise low-level control over the storage devices in order to execute (perform) data transactions on behalf of the hosts 102. In the illustrated embodiment, the storage system 104 includes two storage controllers 108 in communication with a number of storage devices 114 via a backplane 116.

In addition to data handling and processing resources, each storage controller 108 may also include a controller cache 118. Similar to a disk cache, the controller cache 118 may be used to store data to be written to or read from the storage devices 114. The controller caches 118 are typically much faster to access than the storage devices 114 and provide a mechanism expediting data transactions. The controller caches 118 may include any volatile or non-volatile storage medium and common examples include battery-backed DRAM and flash memory.

As discussed above, there is a possibility that transaction may fail before it reaches the storage devices 114. Of particular concern is that the storage system 104 will report a transaction as successfully writing to the storage devices 114 before a failure occurs that prevents the write from actually occurring. To address this, certain classes of transactions, referred to herein as protected-mode transactions, guarantee that the requested changes are eventually written to the storage devices 114. To insure against failure, at least two copies of the data and/or metadata may be retained until the transaction is completed on the storage devices 114. The additional copy may be used to recover the data and recreate the transaction if it fails.

In the interest of brevity, some examples herein describe a protected-mode write transaction, although it is understood that the principles herein apply equally to any data transaction where two or more copies are retained to so that the transaction may be recovered. In a typical example, separate copies of transaction data are stored in the caches of two different storage controllers 108. Thus, in an embodiment, a first storage controller 108 stores a copy of the data and/or metadata in its controller cache 118 prior to performing the transaction on the storage devices 114. The first storage controller 108 may also provide the data and/or metadata to a second storage controller 108 over an inter-controller bus 120 for storing in the second controller's controller cache 118. This is referred to as mirroring, and accordingly, the inter-controller bus 120 may be referred to as a mirror channel. This duplication may take place before the data is written to the storage devices 114. In this way, the storage system 104 can recreate the transaction should either storage controller 108 fail before the write to storage is complete.

Once the second storage controller 108 has cached a redundant copy of the transaction's data and/or metadata, the storage system 104 may provide the initiating host 102 with a transaction completion response even if the transaction has not yet written to the storage device 114. To the host 102, a protected-mode transaction is not safely received until the redundant copy is made because before that point, the transaction may be lost if the first storage controller 108 fails. After the copy is made and the completion response is received, however, a host 102 application may proceed and may rely on the guarantee that the storage system 104 can recover the transaction from the duplicate copy. It is understood that further embodiments expand on this redundancy by applying these principles to groups of three or more storage controllers 108 or three or more copies of the data/metadata.

The storage system 104 may also include one or more non-volatile discrete caches 122. The caches 122 may be discrete and separate from the storage controllers 108 such that a failing storage controller 108 will not compromise the discrete caches 122. The storage controllers 108 may be coupled to the discrete caches 122 by the inter-controller bus 120, by the backplane 116, or by any other suitable communication link, with suitable link types including PCI Express (PCIe), SAS, Fibre Channel, FCoE, SATA, and eSATA. In some embodiments, the discrete caches 122 are multi-ported, with each port directly coupled to a storage controller 108 by a dedicated point-to-point connection and/or a multipoint bus. Multi-ported discrete caches 122 are capable of handling reads and writes from each coupled storage controller 108 concurrently, and in one such embodiment, each port of a multi-ported discrete cache 122 has dedicated PCIe lanes coupling the cache 122 to the respective storage controller 108.

The discrete caches 122 may include any suitable storage technology including resistive RAM (RRAM), phase-change RAM (PCRAM), flash memory (e.g., NAND/NOR flash memory), battery-backed DRAM, and/or other storage media. In some examples, the discrete caches 122 include Storage Class Memory (SCM), a class of high-speed byte- or block-addressable non-volatile memory devices that utilize any of a variety of storage technologies to provide latencies an order of magnitude faster (or more) than conventional flash SSDs. The high bandwidth and low latency of SCMs make them well-suited for use as a data cache in high-performance applications. SCMs are also suitable for use as non-cache storage devices 114, and in some embodiments, the storage system 104 is an all-SCM storage system that includes Storage Class Memories for the storage devices 114 as well as the discrete caches 122.

In some embodiments, the discrete caches 122 are partitioned, with each partition 124 set aside for data or metadata associated with a particular storage controller 108. In the illustrated embodiment, each cache 122 includes four partitions 124 although it is understood that the principles herein apply to any number of partitions (e.g., 2, 4, 6, 8, 10, etc.). The illustrated partitions 124 include a data partition and a metadata partition associated with a first storage controller 108 ("Controller A") and a data partition and a metadata partition associated with a second storage controller 108 ("Controller B"). The partitions 124 are accessible by the respective storage controller 108 during normal operation, and in the event of a storage controller 108 failure, may be used by the other storage controller(s) 108 to recover transactions. For redundancy, the partitions 124 may be mirrored across discrete caches 122. In such embodiments, one of the partitions 124 may be designated a primary partition, and the corresponding partition(s) 124 on the remaining discrete caches 122 may be designated mirrors of the primary partition.

Figure 2:
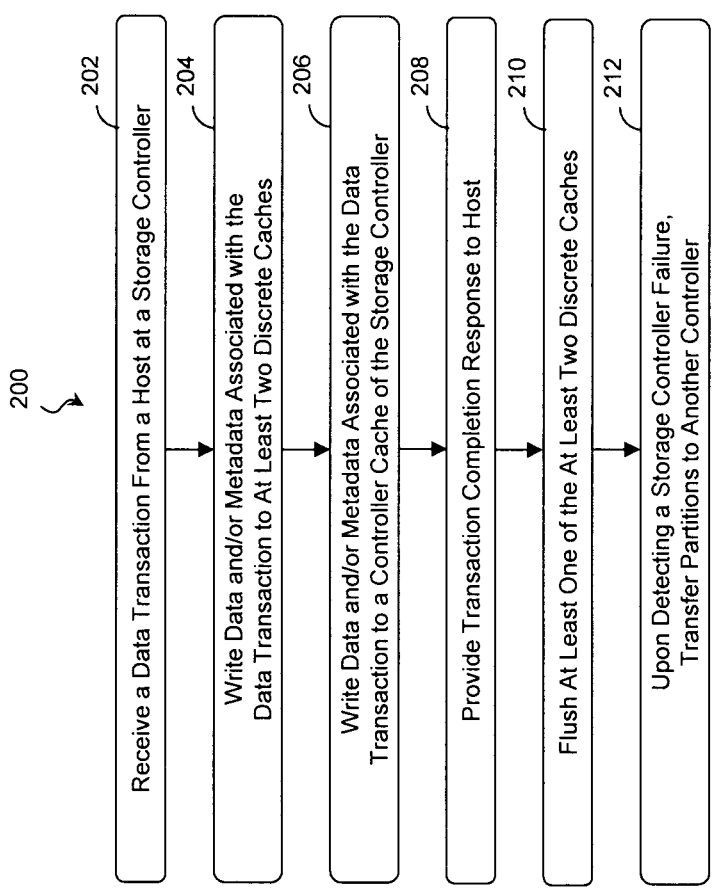
FIG. 2 is a flow diagram of a method of executing a protected-mode data transaction according to aspects of the present disclosure.
Figure 3:
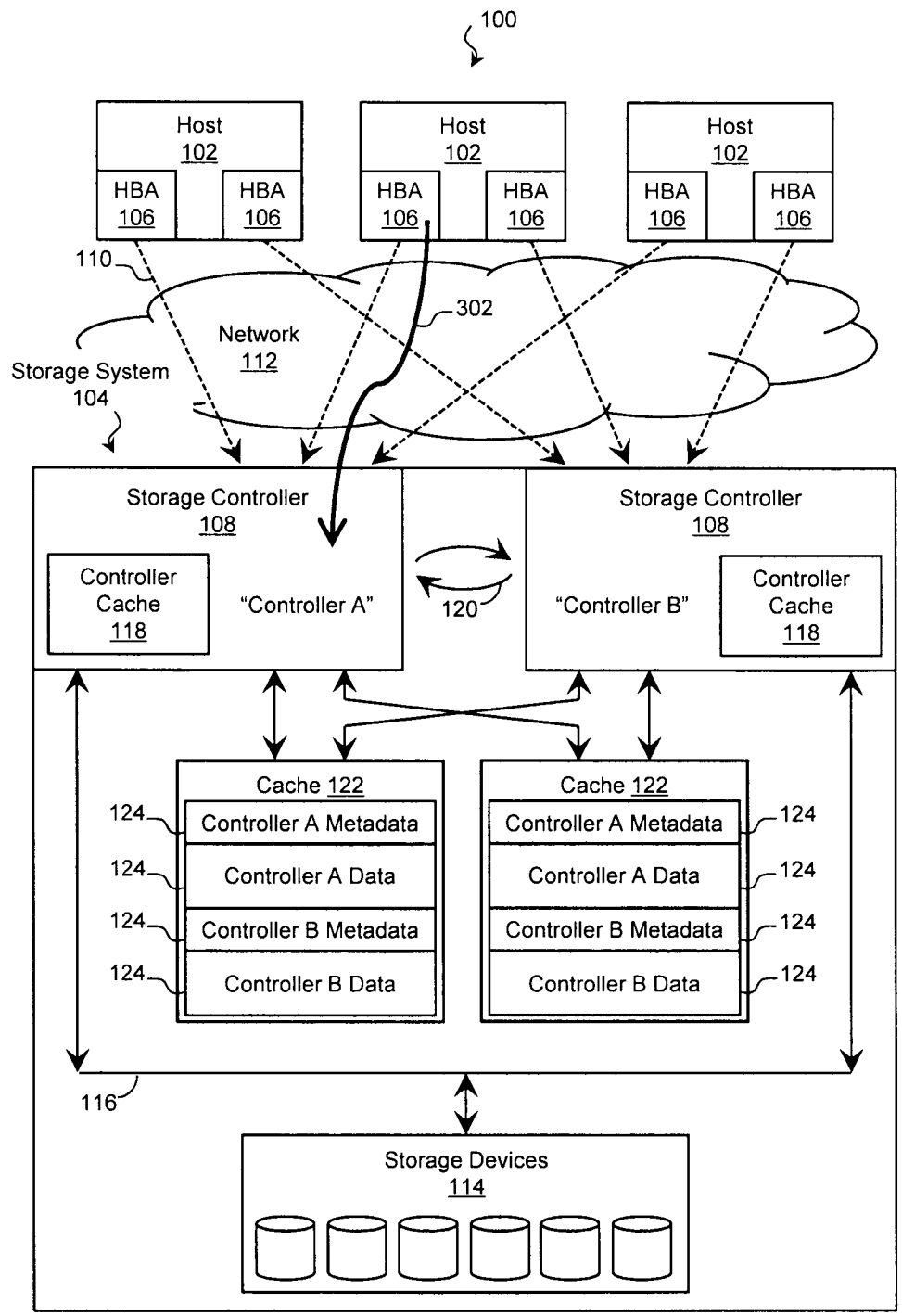
FIGS. 3, 4, and 5 are schematic diagrams of an exemplary storage architecture at various stages of the method of executing a protected-mode data transaction according to aspects of the present disclosure.
Figure 4:
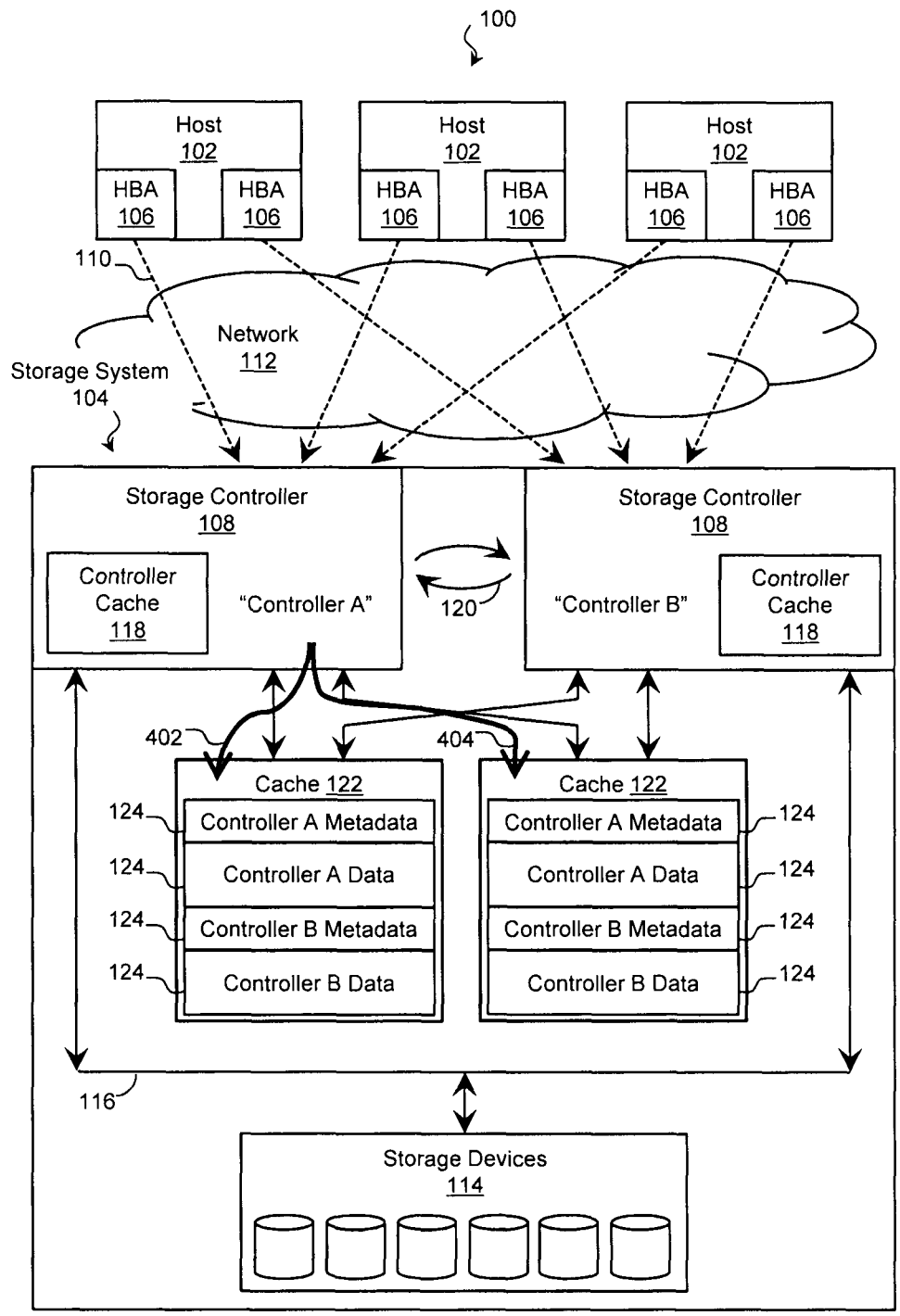
Figure 5:
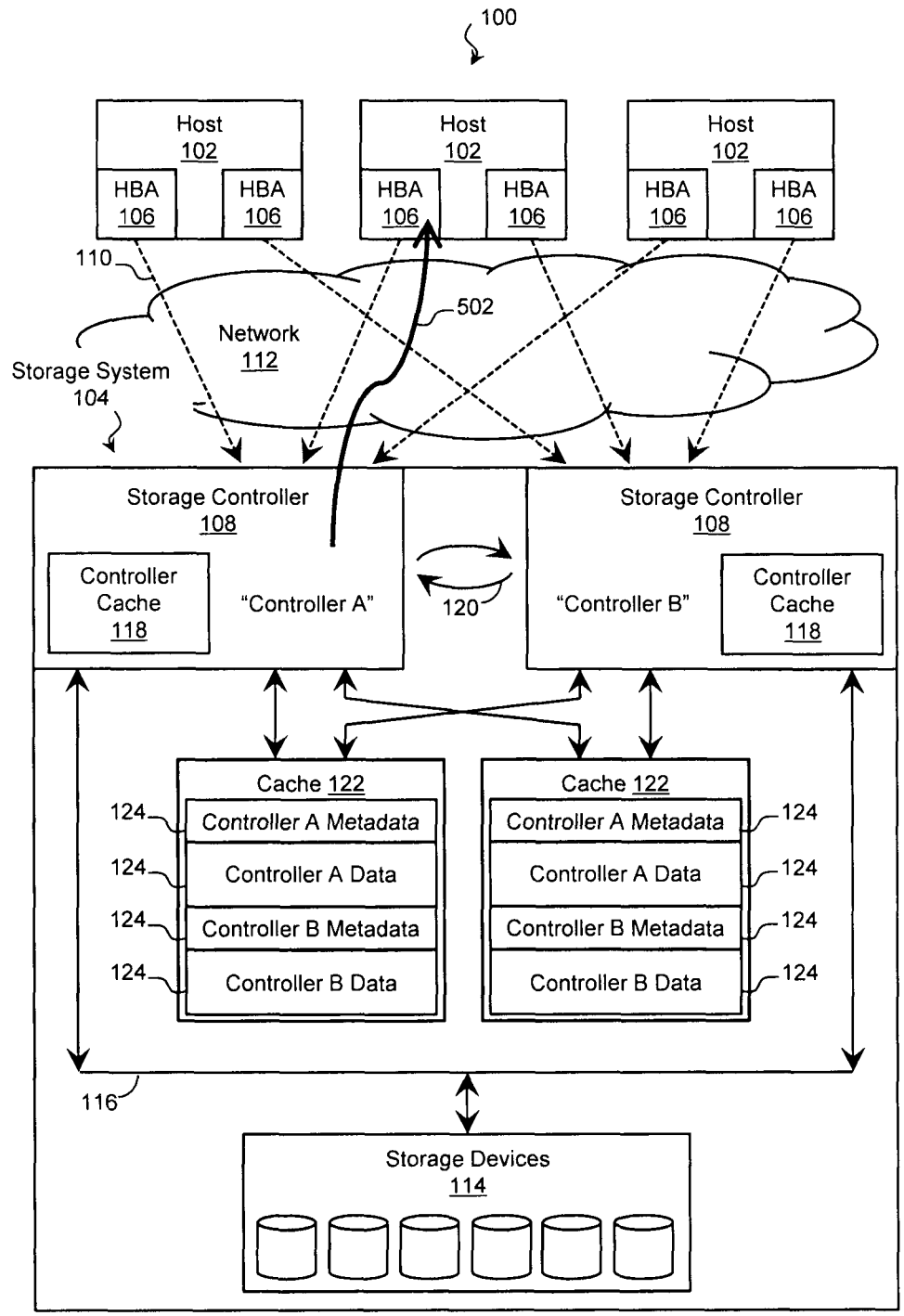

In the examples that follow, the storage controller(s) 108 utilize the discrete caches 122 in addition to or as a substitute for a controller cache 118. A system and technique for providing data redundancy using the discrete caches 122 is described with reference to FIGS. 2-5. FIG. 2 is a flow diagram of a method 200 of executing a protected-mode data transaction according to aspects of the present disclosure. It is understood that additional steps can be provided before, during, and after the steps of the method 200 and that some of the steps described can be replaced or eliminated for other embodiments of the method 200. FIGS. 3-5 are schematic diagrams of an exemplary storage architecture 100 at various stages throughout the method 200 according to aspects of the present disclosure. The storage architecture 100 of FIGS. 3-5 may be substantially similar to storage architecture 100 of FIG. 1 in many regards. For example, the storage architecture 100 may include one or more hosts 102 in communication with one or more storage systems 104 in order to read from and write to the storage devices 114, each element substantially similar to those described in the context of FIG. 1.

Referring first to block 202 of FIG. 2 and to FIG. 3, a data transaction is received by the storage system 104 from the host 102 as indicated by arrow 302. More specifically, the data transaction is received by a storage controller 108 of the storage system. The data transaction may include a request to read, write, or otherwise access data stored on the storage devices 114, and may contain fields that encode a command, data, metadata, and/or any other relevant information. In the examples that follow, the data transaction is a protected-mode transaction such as a protected-mode write transaction.

Referring to block 204 of FIG. 2 and to FIG. 4, the receiving storage controller 108 writes data and/or metadata associated with the data transaction to at least two of the discrete caches 122 as indicated by arrows 402 and 404. In this manner, the storage controller 108 operates the discrete caches 122 as symmetric mirrors of one another. The mirrored copies provide redundancy in the event that one of the discrete caches 122 fails. In some embodiments, the storage controller 108 writes to the discrete caches 122 in parallel, which may prove noticeably faster than mirroring transactions in another storage controller's controller cache 118. In this manner, the discrete caches 122 may reduce transaction latency by reducing the time to create a redundant copy. In the illustrated embodiment, each discrete cache 122 is partitioned and includes metadata and/or data partitions for each coupled storage controller 108. In such embodiments, the storage controller 108 writes the data and/or metadata to the respective partition(s) associated with the writing storage controller 108. In some embodiments in which the host 102 and the discrete cache 122 are both coupled to the storage controller 108 using the same protocol, the data and/or metadata to be cached can be provided directly to the discrete cache 122 by the storage controller 108 without any translation, re-encapsulation, or other modification. For example, in one such embodiment, the host 102 and the discrete cache 122 are each coupled to the storage controller 108 by a respective PCIe bus. This allows the data/metadata to be passed to the discrete cache 122 by merely forwarding the host's PCIe command.

Depending on the associativity of the discrete caches 122, the storage controller 108 may generate additional metadata that maps addresses (logical or physical) of the discrete caches 122 to addresses (logical or physical) of the storage devices 114. This discrete cache mapping may be included in the metadata written to the discrete caches 122 in block 204. The discrete cache mapping may be subsequently used by any storage controller 108 during a read from the discrete caches 122, a flush of the discrete caches 122, or any other suitable operation.

This technique provides several advantages over mirroring data to another storage controller 108. For example, SCMs are often larger and less expensive than a controller cache, so cache size may be increased. Because the data and/or metadata does not need to be exchanged between storage controllers 108 during a mirroring process, the amount of traffic on the inter-controller bus 120 may be reduced. Furthermore, each storage controller 108 may have a finite processing capacity. Relieving a first storage controller 108 of the task of mirroring a second storage controller 108 allows greater processing resources to be devoted to performing the first storage controller's own transactions. Similarly, a portion of a controller cache 118 that would otherwise be reserved for mirroring may be devoted to caching the storage controller's own transactions.

Referring to block 206 of FIG. 2 and referring still to FIG. 4, the receiving storage controller 108 may also cache some portion of the data and/or metadata associated with the data transaction in the controller cache 118. In some embodiments, both data and metadata are stored in the controller cache 118. This provides greater redundancy in the event a discrete cache 122 fails. In some embodiments, only the hottest data (data expected to be read or written again in the near future) is stored in the controller cache 118. As an alternative, the storage controller 108 may cache only the metadata in the controller cache. This may allow the controller cache 118 to cache a larger portion of the total address space. In some such embodiments, to maximize the address space cached by the controller cache 118, only the metadata that maps addresses of the discrete caches 122 to addresses of the storage devices 114 is stored in the controller cache 118. The write to the controller cache 118 may be performed concurrently with the write to the discrete caches 122 of block 204.

Referring to block 208 of FIG. 2 and referring to FIG. 5, upon determining that a minimum number of copies of the data and/or metadata associated with the transaction have been stored (e.g., two or more copies) in the discrete caches 122 and/or the controller cache 118, the storage controller 108 provides a transaction completion response to the host 102 as indicated by arrow 502.

Referring to block 210 of FIG. 2, at any time, the storage controller 108 may flush the discrete caches 122 by writing data to the storage devices 114. To do so the storage controller 108 may read from one or more of the discrete caches 122 to obtain the data and/or the metadata to be written to the storage devices 114.

Referring to block 212 of FIG. 2, upon detecting that a first storage controller 108 has failed, a second storage controller 108 may assume control over the first storage controller's partitions 124 on the discrete caches 122. The second storage controller 108 may continue to service transactions seamlessly by using both the first storage controller's partitions 124 and the second storage controller's partitions 124. In some embodiments, this allows the first storage controller 108 to be replaced (i.e., swapped) without interruption and without rebuilding the replacement storage controller's controller cache 118. To ensure data integrity, in some embodiments, the second storage controller 108 may flush the first storage controller's partitions 124 upon detecting that the first storage controller 108 has failed.

Figure 6:
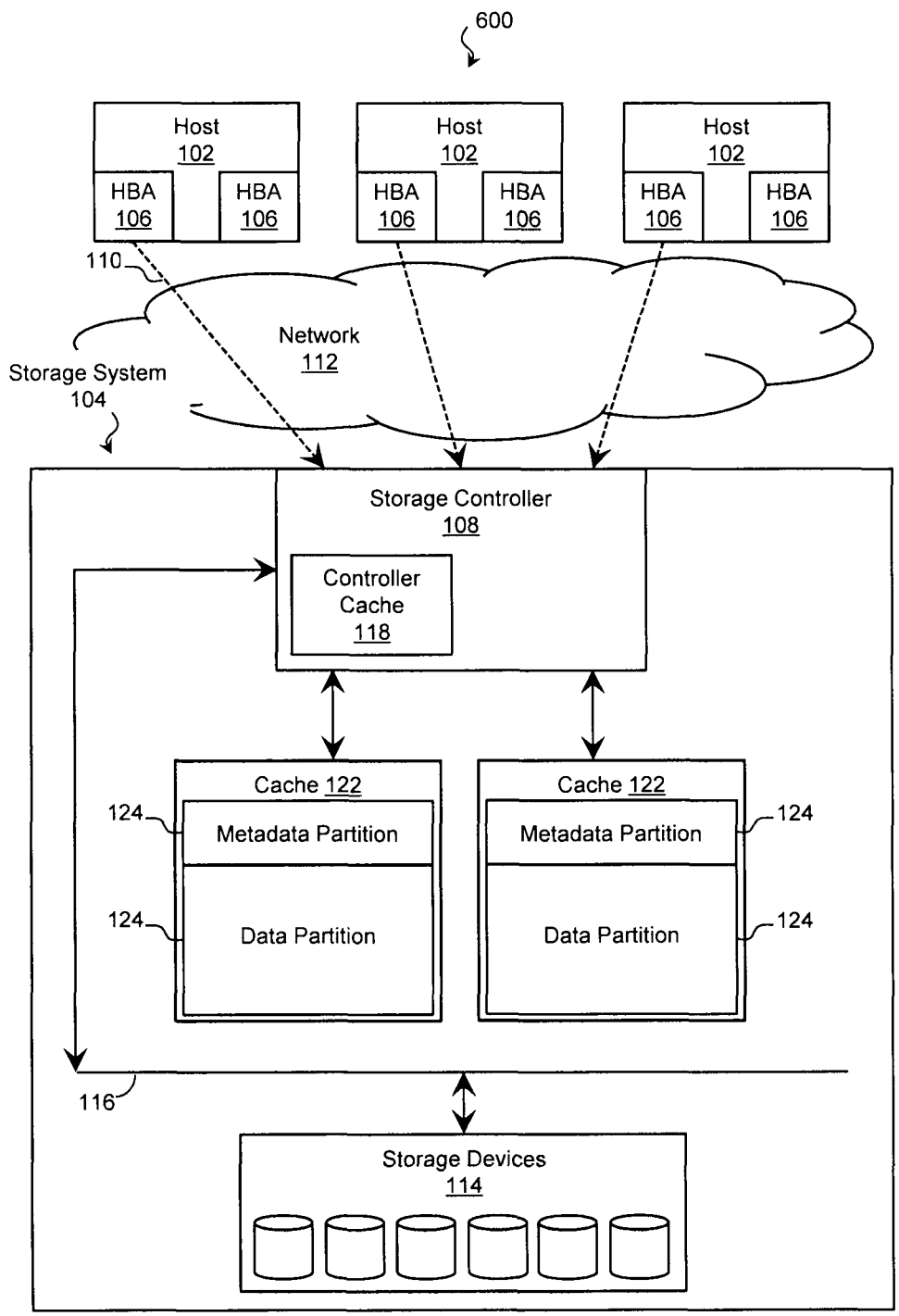
FIG. 6 is a schematic diagram of a further storage architecture performing the method of executing a protected-mode data transaction according to aspects of the present disclosure.

While the previous examples described a storage system 104 with more than one storage controller 108, it can be seen that the use of discrete caches 122 provides data redundancy and protected-mode capability even for a storage system 104 with only a single storage controller 108. As each additional storage controller 108 may be substantially more expensive than the discrete caches 122, embodiments with a single storage controller 108 provide an attractive option. Some such embodiments are described in the context of FIG. 6. FIG. 6 is a schematic diagram of a further storage architecture 600 performing the method of executing a protected-mode data transaction according to aspects of the present disclosure. Each element of the storage architecture 600 may be substantially similar to those of FIGS. 1 and 3-5, with the exception of the storage system 104, which only includes a single storage controller 108, and the discrete caches 122, which only contain data and metadata partitions 124 for a single storage controller.

Referring to block 202 of FIG. 2 and to FIG. 6, a data transaction is received by the storage controller of the storage system 104 from the host 102. The data transaction may include a request to read, write, or otherwise access data stored on the storage devices 114, and may contain fields that encode a command, data, metadata, and/or any other relevant information. Referring to block 204 of FIG. 2, the storage controller 108 writes data and/or metadata associated with the data transaction to at least two of the discrete caches 122. In some embodiments, the storage controller 108 writes to the discrete caches 122 in parallel. In the illustrated embodiment, each discrete cache 122 is partitioned and includes separate metadata and data partitions for the storage controller 108. In such embodiments, the storage controller 108 writes the data and/or metadata to the respective data or metadata partition 124.

Depending on the associativity of the discrete caches 122, the storage controller 108 may generate additional metadata that maps addresses (logical or physical) of the discrete caches 122 to addresses (logical or physical) of the storage devices 114. This cache mapping may be included in the metadata written to the discrete caches 122 in block 204.

Referring to block 206 of FIG. 2, the storage controller 108 may also cache some portion of the data and/or metadata associated with the data transaction in the controller cache 118. In some embodiments, both data and metadata are stored in the controller cache 118. This provides greater redundancy in the event a discrete cache 122 fails. In some embodiments, only the hottest data (data expected to be read or written again in the near future) is stored in the controller cache 118. As an alternative, the storage controller 108 may cache only the metadata in the controller cache 118. This may allow the controller cache 118 to cache a larger portion of the total address space. In some such embodiments, to maximize the address space cached by the controller cache 118, only the metadata that maps addresses of the discrete caches 122 to addresses of the storage devices 114 is stored in the controller cache 118. The write to the controller cache 118 may be performed concurrently with the write to the discrete caches 122 of block 204.

Referring to block 208 of FIG. 2, upon determining that a minimum number of copies of the data and/or metadata associated with the transaction have been stored (e.g., two or more copies) in the discrete caches 122 and/or the controller cache 118, the storage controller 108 provides a transaction completion response to the host 102.

Referring to block 210 of FIG. 2, at any time, the storage controller 108 may flush the discrete caches 122 by writing data to the storage devices 114.

Referring to block 212 of FIG. 2, upon detecting that a first storage controller 108 has failed, a second storage controller 108 (which may be a replacement for the failed first controller) may assume control over the first storage controller's partitions 124 on the discrete caches 122. The second storage controller 108 may continue to service transactions seamlessly by using the first storage controller's partitions 124. In some embodiments, this allows the first storage controller 108 to be replaced (i.e., swapped) without interruption and without rebuilding the replacement storage controller's controller cache 118. To ensure data integrity, in some embodiments, the second storage controller 108 may flush the first storage controller's partitions 124 upon detecting that the first storage controller 108 has failed.

Figure 7:
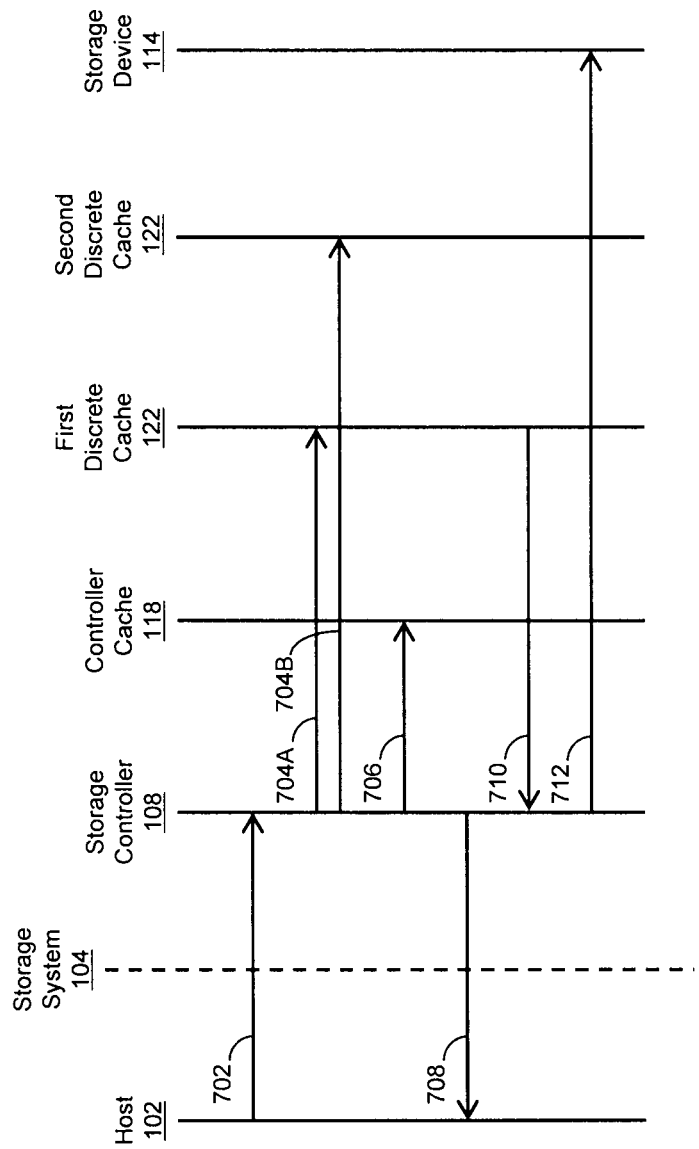
FIG. 7 is a timing diagram illustrating an exemplary sequence for performing the method of executing a protected-mode data transaction according to aspects of the present disclosure.

The sequence of method 200 will now be described in more detail with reference to FIG. 7. FIG. 7 is a timing diagram illustrating an exemplary sequence for performing the method of executing a protected-mode data transaction according to aspects of the present disclosure.

Arrow 702 represents a host 102 providing and a storage controller 108 receiving a data transaction as described in block 202 of FIG. 2. Arrows 704A and 704B represent the storage controller 108 writing data and/or metadata associated with the data transaction to two discrete caches 122 as described in block 204. These writes may be performed concurrently. Arrow 706 represents the storage controller 108 writing data and/or metadata associated with the data transaction to the controller cache 118 as described in block 206. This may be performed concurrently with the writes of arrows 704A and 704B. Arrow 708 represents the storage controller 108 providing and the host 102 receiving a transaction completion response as described in block 208. Arrows 710 and 712 represent the storage controller 108 flushing a discrete cache 122 as described in block 210. In that regard, arrow 710 represents the storage controller 108 reading data and/or metadata from one of the discrete caches 122, and arrow 712 represents a write of the data and/or metadata to a storage device 114.

Figure 8:
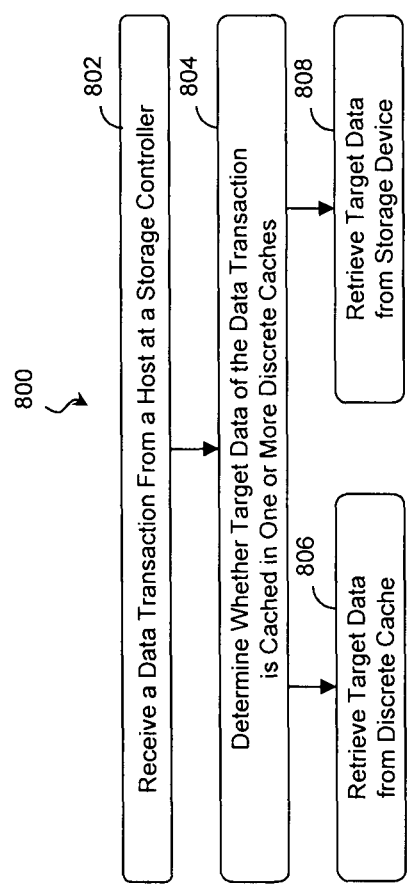
FIG. 8 is a flow diagram of a method of executing a read data transaction according to aspects of the present disclosure.

Whereas the previous examples described a write transaction, a system and technique for performing read transactions using the discrete caches 122 is described with reference to FIG. 8. FIG. 8 is a flow diagram of a method 800 of executing a read data transaction according to aspects of the present disclosure. It is understood that additional steps can be provided before, during, and after the steps of the method 800 and that some of the steps described can be replaced or eliminated for other embodiments of the method 800. The method 800 may be performed by any suitable system including storage architecture 100 of FIGS. 1 and 3-5 and storage architecture 600 of FIG. 6.

Referring to block 802 of FIG. 8, a data transaction is received by a storage controller 108 of the storage system 104 from a host 102. The data transaction may include a request to read, write, or otherwise access data stored on the storage devices 114, and may contain fields that encode a command, data, metadata, and/or any other relevant information. Referring to block 804 of FIG. 8, the receiving storage controller 108 may examine metadata stored in various locations to determine whether the read can be completed using the discrete caches 122. For example, in some embodiments, the receiving storage controller 108 may query a mapping of addresses of the discrete caches 122 to addresses of the storage devices 114 to determine whether the target data can be found in the discrete caches 122. In various such embodiments, the mapping is stored in the controller cache 118 and/or the discrete caches 122.

Referring to block 806 of FIG. 8, if the target data is located in either of the discrete caches 122, it is retrieved from the respective discrete cache 122 and provided to the requesting host 102. In some embodiments in which the host 102 and the discrete cache 122 are both coupled to the storage controller 108 using the same protocol, the target data can be provided directly to the host 102 by the storage controller 108 without any translation, re-encapsulation, or other modification. For example, in one such embodiment, the host 102 and the discrete cache 122 are each coupled to the storage controller 108 by a respective PCIe bus. This allows the target data to be passed to the host 102 as a response to the host's PCIe command.

Referring to block 808 of FIG. 8, if the transaction misses in the discrete cache 122, the target data is retrieved from the storage devices 114 and provided to the requesting host 102.

The present embodiments can take the form of an entirely hardware embodiment, an entirely software embodiment, or an embodiment containing both hardware and software elements. In that regard, in some embodiments, the computing system is programmable and is programmed to execute processes including those associated with the processes of methods 200 and/or 800 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, the storage controllers 108 and/or one or more processors running in one or more of the storage system 104 or the hosts 102 execute code to implement the actions described above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a data transaction, wherein the data transaction is received by a storage controller of a storage system and received from a host system;
caching, by the storage controller, at least one of data or metadata associated with the data transaction into at least two discrete cache devices that are discrete from the storage controller, wherein each of the at least two discrete cache devices is a non-volatile memory device;
concurrently with caching the at least one of data or metadata into the at least two discrete cache devices, caching the metadata into a controller cache of the storage controller; and
after the caching of the at least one of data or metadata to the at least two discrete cache devices, providing a transaction completion response to the host system from which the data transaction is received.

2. The method of claim 1, wherein the at least two discrete cache devices include storage class memory, and wherein the storage class memory includes at least one of a resistive random access memory (RAM) device, a phase-change RAM device, a flash memory device, or a battery-backed dynamic random access memory (DRAM) device.

3. The method of claim 1, wherein the at least two discrete cache devices are coupled to the storage controller by a peripheral component interconnect (PCI) Express (PCIe) interface, and wherein the caching of the at least one of data or metadata includes providing the at least one of data or metadata from the storage controller to the at least two discrete cache devices via the PCIe interface.

4. The method of claim 1, further comprising:
concurrently with caching the metadata to the at least two discrete cache storage devices, storing the in the controller cache of the storage controller.

5. The method of claim 4, wherein the at least one of data or metadata includes both data and metadata associated with the data transaction.

6. The method of claim 1, wherein the at least one of data or metadata includes metadata associated with the data transaction, the method further comprising:
caching, by the storage controller, the data associated with the data transaction to the at least two discrete cache devices without storing the data in the controller cache.

7. The method of claim 1 further comprising determining a mapping of an address of the at least two discrete cache devices to an address of a storage device, wherein the caching of the at least one of data or metadata includes caching the mapping to the at least two discrete cache devices.

8. The method of claim 7 further comprising storing the mapping in the controller cache of the storage controller.

9. The computing device of claim 1, further comprising storing the metadata in the controller cache of the storage controller, wherein the metadata maps address of the at least two discrete cache devices to an address of a storage device.

10. A non-transitory machine readable medium having stored thereon instructions for performing a method of executing a data transaction, comprising machine executable code which when executed by at least one machine, causes the at least one machine to:
receive a data transaction from a host system;
cause a storage controller to concurrently cache an element associated with the data transaction into at least two non-volatile cache devices and into a controller cache associated with the storage controller and that is distinct from the at least two non-volatile cache devices,
wherein the at least two non-volatile cache devices are discrete from the storage controller,
wherein the element is cached to partitions of the at least two non-volatile cache devices, and
wherein the partitions are associated with the storage controller;
after the element is cached, provide a transaction completion response to the host system.

11. The non-transitory machine readable medium of claim 10 comprising further machine executable code that causes the machine to:
when a failure of the storage controller is detected, associate the partitions with another storage controller.

12. The non-transitory machine readable medium of claim 10, wherein each of the at least two non-volatile cache devices includes a storage class memory, and wherein the code to cause the storage controller to concurrently cache the element includes code to cause the storage controller to provide the element to the storage class memories via a peripheral component interconnect (PCIe) bus.

13. The non-transitory machine readable medium of claim 10, comprising further machine executable code that causes the storage controller to cache the element in a wherein the controller cache is within the storage controller that is different from the at least two non-volatile cache devices.

14. The non-transitory machine readable medium of claim 13 wherein the element includes metadata associated with the data transaction, the non-transitory machine readable medium comprising further machine executable code that causes the storage controller to cache data associated with the data transaction in the at least two non-volatile cache devices without caching the data in the controller cache.

15. The non-transitory machine readable medium of claim 13 wherein the element includes data and metadata associated with the data transaction.

16. The non-transitory machine readable medium of claim 10 comprising further machine executable code that causes the storage controller to cache, in the at least two non-volatile cache devices, a mapping of an address of the at least two non-volatile cache devices to an address of a storage device.

17. A computing device comprising:
a memory containing machine readable medium comprising machine executable code having stored thereon instructions for performing a method of executing a data transaction;
a processor coupled to the memory, the processor configured to execute the machine executable code to:
receive a transaction from a host;
concurrently cache, using a storage controller, metadata associated with the transaction into at least two non-volatile storage class memories that are distinct from the storage controller and into a controller cache associated with the storage controller; and
concurrently cache, using the storage controller, data associated with the transaction into the at least two non-volatile storage class memories without caching the data in the controller cache.

18. The computing device of claim 17, wherein the at least two non-volatile storage class memories each include at least one of a resistive RAM device, phase-change RAM device, a flash memory device, or a battery-backed DRAM device.

19. The computing device of claim 17, wherein the at least two non-volatile storage class memories are coupled to the storage controller by a peripheral component interconnect (PCIe) interface.

20. The computing device of claim 17, wherein the metadata includes a mapping of an address of the at least two non-volatile storage class memories to an address of a storage device.

* * * * *